United States Patent [19]
Hechler

[11] Patent Number: 5,826,357
[45] Date of Patent: Oct. 27, 1998

[54] ENTERTAINMENT AND FIREPLACE ASSEMBLY

[76] Inventor: Duaine Hechler, 1013 Justice Ct., Florissant, Mo. 63034

[21] Appl. No.: 675,221

[22] Filed: Jul. 8, 1996

[51] Int. Cl.$^6$ ........................................ G09F 19/00
[52] U.S. Cl. ................................... 40/428; 472/65
[58] Field of Search ........................... 40/428; D23/343, D23/345, 349, 350, 403, 404, 405, 406; 472/65; 312/204, 223.1, 242

[56] References Cited

U.S. PATENT DOCUMENTS

| | | | |
|---|---|---|---|
| D. 30,402 | 3/1899 | Nichols | D23/404 |
| 1,164,024 | 12/1915 | Smith | D23/345 X |
| 1,901,294 | 3/1933 | Gritt et al. | 472/65 X |
| 3,723,046 | 3/1973 | Poling et al. | 472/65 X |
| 5,099,591 | 3/1992 | Eiklor et al. | 40/428 |

*Primary Examiner*—Cassandra H. Davis

[57] ABSTRACT

The "Mood-Place" fireplace is any smoke-free fireplace that contains an audio cassette player/recorder, an audio compact-disc (CD) player/recorder, a video cassette player/recorder, audio speakers and grills, an overhead television projection system, a refillable pump spray time-released mechanism (to release the scent of "burning wood"), and pre-recorded fireplace sound effects audio cassettes and/or audio compact-disc's (CD's) with or without "background music".

1 Claim, 3 Drawing Sheets

ENTERTAINMENT AND FIREPLACE ASSEMBLY

BACKGROUND

1. Field of Invention

This invention relates to any smoke-free fireplace, specifically to enable the consumer to make the fireplace the center of attention in a room by adding sound effects, music, TV, and/or VCR and the scent of wood-burning fireplaces.

2. Description of Prior Art

The fireplace industry commonly supply consumers with fireplaces for the purposes of heating and for creating a sense of mood and/or atmosphere. Currently, there are three basic types of fireplaces; wood burning, natural gas burning, and electric or artificial fireplaces. The wood burning fireplaces can only supply part of the full atmosphere or mood setting by having the sound effects of wood crackling and the smell of burning wood. The natural gas and electric or artificial fireplaces have none of the mood setting or atmosphere effects. There is no smell of burning wood, no crackling and/or popping, etc. Also, the home builders industry, unless specifically designed and/or custom built, usually place fireplaces on short width walls where home entertainment components, such as; TV's, VCR's, and audio equipment cannot be placed on the same wall or near the fireplace. Also, the furniture arrangement in the average home can not be arranged to take full advantage of the mood or atmosphere settings of fireplaces. Most often chairs and couches can not face the fireplace because they are usually facing your entertainment center which usually includes a TV and/or stereo audio equipment.

OBJECTS AND ADVANTAGES

Accordingly, besides the objects and disadvantages described in my above patent, several objects and advantages of this invention are;

(a) to enable the consumer to add the atmosphere of a real wood-burning fireplace with respect to the sound effects of a wood-burning fireplace (b) to enable the consumer to add the atmosphere of a real wood-burning fireplace with respect to the smells of a wood burning fireplace (c) to enable the consumer to make the fireplace the center of attention by adding an audio system to let music emanate from the fireplace (d) to enable the consumer to make the fireplace the center of attention by adding a video system to watch pre-recorded video cassette tapes while being in front of the fireplace (e) to enable the consumer to make the fireplace the center of attention by adding an overhead television system to watch their favorite TV program while being in front of the fireplace (f) to enable the consumer to make the fireplace the center of attention by letting the consumer arrange the furniture in the room to face the fireplace Further objects and advantages of this invention are to combine the fireplace with components of the entertainment industry to create a exciting and new consumer product which can be modeled in new display homes, club houses, etc.

DRAWING FIGURES

Reference Numerals in Drawings

Figure 1:
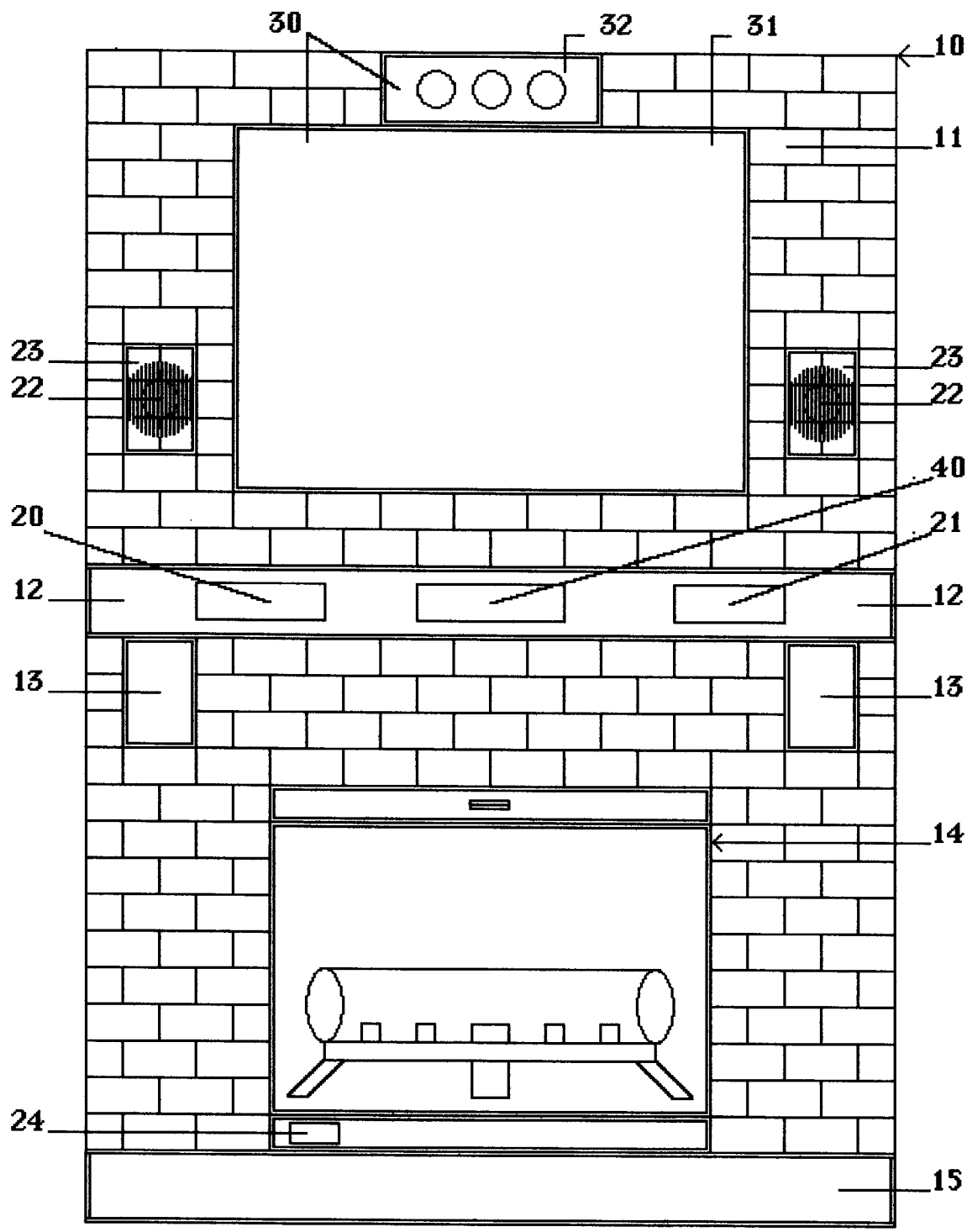
FIG. 1 shows a front view of the "Mood Place" fireplace.
Figure 2:
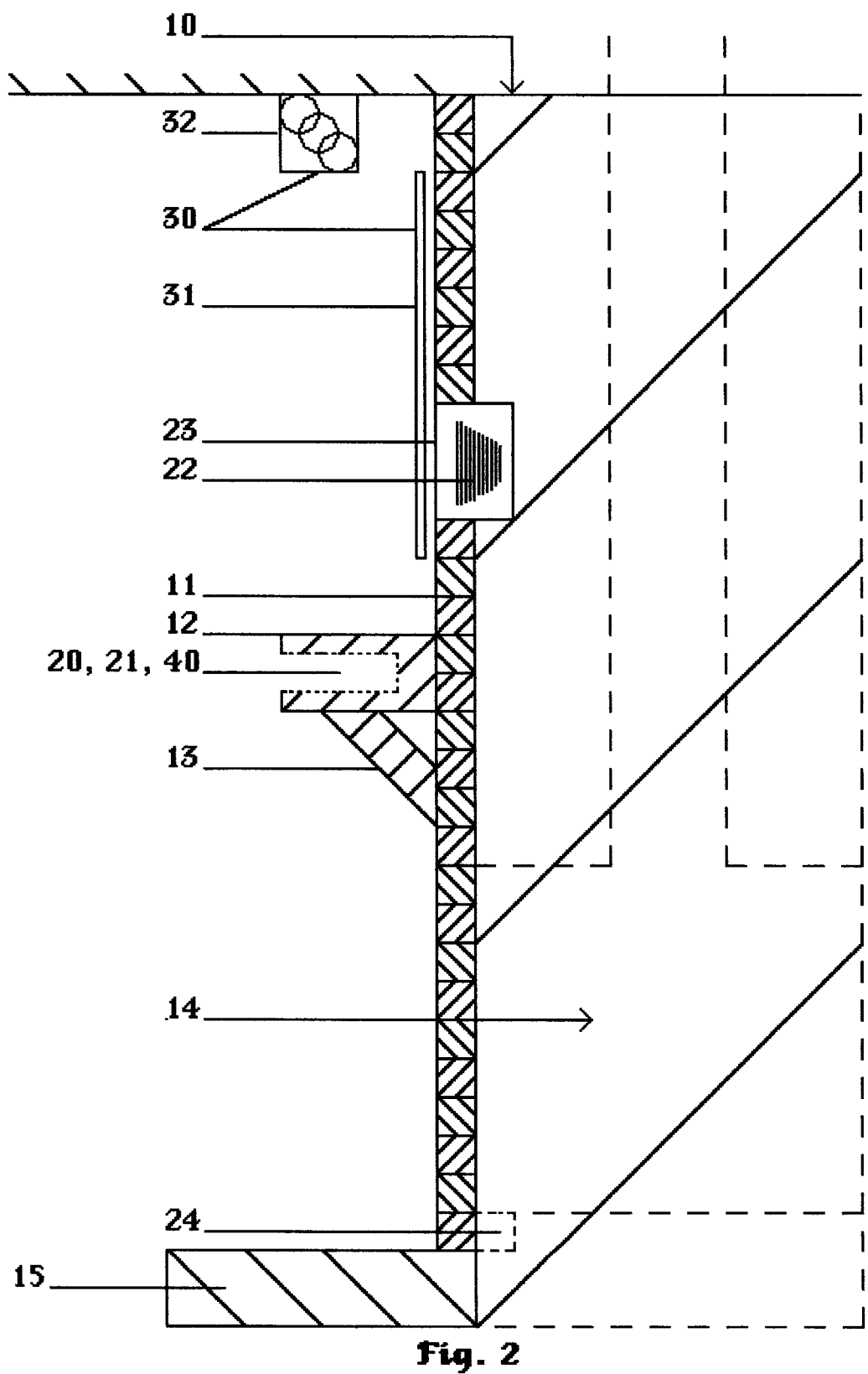
FIG. 2 shows a side view of the "Mood Place" fireplace.
Figure 3:
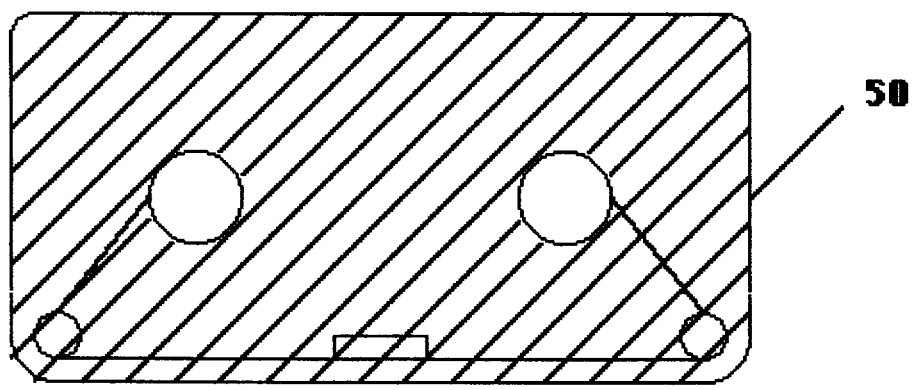
FIG. 3 shows a view of a current industry standard audio cassette.
Figure 4:
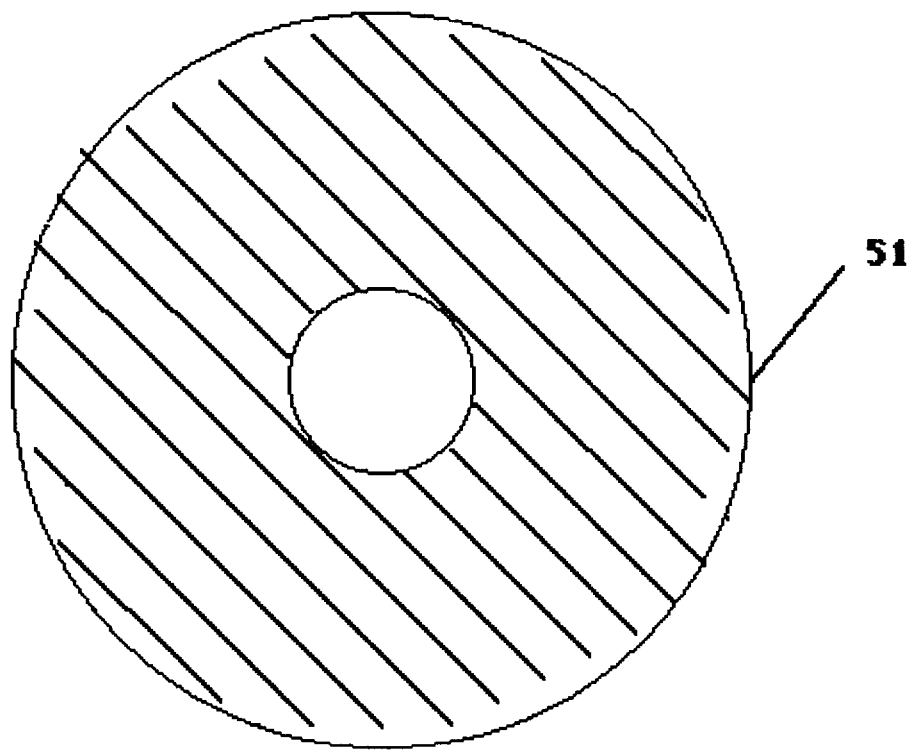
FIG. 4 shows a view of a current industry standard compact disk (CD).

| | |
|---|---|
| 10 Assembled fireplace | 11 Fireplace facade |
| 12 Mantel | 13 Supports for mantel |
| 14 Assembled firebox | 15 Hearth |
| 20 Audio Cassette Recorder/Player | 21 Audio CD Player |
| 22 Audio Speakers | 23 Audio speaker grille material |
| 24 Combination aerosol spray and time-released mechanism | |
| 30 Overhead TV system | 31 Overhead TV screen |
| 32 Overhead TV projector | |
| 40 Video Cassette Recorder | |
| 50 Audio Cassette | 51 Audio Compact Disk (CD) |

DESCRIPTION

The "Mood-Place" fireplace is any smoke-free fireplace 10 that contains an audio cassette player/recorder 20, an audio compact-disc (CD) player/recorder 21, and a video cassette player/recorder 40 disposed in a mantel 12. An audio speaker 22 is disposed in the left side of the fireplace 10 above the mantel 12 hidden by speaker grill material 23 to match the facade 11 of the fireplace 10. A matching an audio speaker 22 is disposed in the right side of the fireplace 10 above the mantel 12 hidden by speaker grill material 23 to match the facade 11 of the fireplace 10. An overhead television projection system 30 with the television screen 31 disposed centered in the area above the mantel 12 and the overhead television projection hardware 32 disposed on the ceiling of the room in front of the fireplace 10 as to project the television picture onto the television screen 31. A refillable aerosol or pump spray time-released mechanism 24 is disposed in a compartment under the firebox 14 to release the scent of "burning-wood". Pre-recorded audio cassettes 50 and/or audio compact-disc's (CD's) 51 come with fireplace sound effects with or without "background" music superimposed over the sound effects.

SUMMARY, RAMIFICATIONS, AND SCOPE

Accordingly, the reader will see that the closure of this invention will empower the consumer to take full functional advantage of a smoke-free fireplace. The consumer can now place furniture facing the fireplace and, still, enjoy the smell of a real wood-burning fireplace, listen to music, watch video cassettes and/or watch television.

Although the description above contains many specificities, these should not be construed as limiting the scope of the invention but as merely providing an illustration of some of the embodiments of this invention. For example, the fireplace can have many shapes and sizes, the audio/video/tv can be of any shape, size, brand, manufacturer, etc.

Thus the scope of the invention should be determined by the appended claims and their legal equivalents, rather than by the examples given.

I claim:

1. An entertainment and fireplace assembly consisting of a smoke-free fireplace further including;

a left side audio speaker disposed in a left side of the fireplace above a mantel;

a left side audio speaker grill disposed on the left side of the fireplace covering the left side audio speaker and matching in appearance of a facade of the fireplace;

a right side audio speaker disposed in a right side of the fireplace above the mantel;

a right side audio speaker grill disposed on the right side of the fireplace covering the right side audio speaker and matching in appearance of the facade of the fireplace;

an audio cassette player/recorder disposed in the mantel;

an audio compact-disc (CD) player/recorder disposed in the mantel;

an overhead television projection system consisting of a television screen disposed centered in an area above the mantel and overhead television projection hardware adaptable to be mounted on a ceiling of a room, in front of the fireplace;

a refillable pump spray time-released mechanism disposed under a firebox to release a scent of "burning-wood";

audio cassettes that are pre-recorded with fireplace sound effects;

audio cassettes that are pre-recorded with fireplace sound effects with "background" music superimposed over the sound effects;

compact-discs (CD's) that are pre-recorded with fireplace sound effects;

compact-discs (CD's) that are pre-recorded with fireplace sound effects with "background" music superimposed over the sound effects.

\* \* \* \* \*